United States Patent [19]
Hunter

[11] Patent Number: 5,238,117
[45] Date of Patent: Aug. 24, 1993

[54] MINERAL PROCESSING SCREEN SEPARATOR

[75] Inventor: Stanley G. Hunter, Johannesburg, South Africa

[73] Assignee: Kemix(Proprietary) Limited, Kew Johannesburgh, South Africa

[21] Appl. No.: 812,573

[22] Filed: Dec. 20, 1991

[51] Int. Cl.$^5$ ............................................. B03B 7/00
[52] U.S. Cl. ................... 209/17; 210/415; 210/416.1; 210/307; 210/311; 209/267; 209/273; 209/306; 209/255; 209/380; 209/389
[58] Field of Search ............... 209/267, 273, 305, 306, 209/255, 380, 389, 250, 17, 270; 210/415, 416.1, 307, 310, 311, 172

[56] References Cited

U.S. PATENT DOCUMENTS

| | | | |
|---|---|---|---|
| 1,970,552 | 8/1934 | Berge | 210/416.1 |
| 2,738,065 | 3/1956 | Mahlkuch | 209/306 X |
| 3,429,445 | 2/1969 | Lee | 210/415 |
| 3,964,996 | 6/1976 | Holz et al. | 209/306 X |
| 4,096,057 | 6/1978 | Porritt et al. | 209/273 X |
| 4,955,482 | 9/1990 | Elmore et al. | 209/269 X |

FOREIGN PATENT DOCUMENTS 658529 6/1929 France ................. 209/306
248082 3/1926 United Kingdom ............... 209/273

OTHER PUBLICATIONS

"Gold and Silver Recovery Innovations", Phase III, vol. 7, Chapter 42, pp. 4079–4184.

*Primary Examiner*—D. Glenn Dayoan
*Attorney, Agent, or Firm*—Matthew K. Ryan

[57] ABSTRACT

This invention relates to a screen separator for separating metal adsorbent particles from a pulp and includes a screen separator for separating metal adsorbent particles from a pulp including an open topped and closed bottom cylindrical screen for axially vertical location, in use, in a tank containing pulp with the open top of the screen at or adjacent the full pulp surface level in the tank, an impeller which is located in the screen with its axis of rotation vertical, drive means, and a drive shaft connecting the drive means to the impeller with the impeller being adapted to drive pulp in the screen upwardly to a level above the surface level of the full pulp level in the tank when the impeller is rotated in the screen. The invention further extends to a method of separating the particles from the pulp by means of the separator and to a metal recover process which employs the separation method.

14 Claims, 3 Drawing Sheets

MINERAL PROCESSING SCREEN SEPARATOR

FIELD OF THE INVENTION

This invention relates to a screen separator for use in adsorbtion cells such as carbon in pulp adsorbtion tanks, carbon in leach tanks, resin in pulp adsorbtion tanks and resin in leach tanks which contain adsorbent particles such as activated carbon or resin and are filled with metal rich solutions or pulps with the screen separators of the tanks being employed to separate the metal rich adsorbent particles in the tanks from the leaner pulp or leach solution, a method of screen separating the adsorbent particles from a pulp and to a process of recovering metal values from the pulp or leach solution in a circuit including a plurality of adsorbtion cells which include the screen separators of the invention.

BACKGROUND TO THE INVENTION

In general practise, a metal rich pregnant pulp or solution is fed into a cell of the above type which contains carbon, resin or like adsorbtion particles and where, by one means or another the adsorbtion particles become loaded with the metal values in the pulp. The adsorbent particles are then screen separated from the now leaner pulp which is then either pumped or gravity fed to an adjacent cell in a series of cells where the process is again repeated. Periodically, in order to achieve counter current movement of the adsorbent particles and pulp a quantity of pulp in any one tank is pumped together with its associated adsorbent upstream to the preceding tank. This arrangement causes back mixing which reduces the efficiency of counter current contacting. Gravity feed requires that sequential cells in the series be expensively vertically staggered in cascade and pumping involves the not inconsiderable expense of providing and maintaining the pumps and motors required to do this. Often air or oxygen is required in the leaching process and this is generally supplied by means of a blower, compressor or from a pressurised vessel which feeds the air or oxygen to the tank where it is then diffused in one way or another below the surface of the pulp in the tank. Again the provision of compressed air or oxygen and diffusers is expensive.

SUMMARY OF THE INVENTION

A method of separating adsorbent particles from a pulp in a tank according to the invention includes the steps of locating an open topped cylindrical screen in the tank with the axis of the screen vertical and the open top of the screen at or adjacent the full pulp surface level of the tank, locating an impeller in the pulp in the screen with its axis of rotation vertical and a portion of its length projecting above the full pulp surface level of the tank rotating the impeller about its axis to drive pulp upwardly from the screen into a receptacle above the full pulp surface level of the tank and discharging the pulp in the receptacle from the tank.

In one form of the invention the impeller includes a shroud which surrounds the impeller blades over a substantial portion of the length of the impeller with the shroud including at least one outlet which is located above the receptacle with the method including the step of causing the impeller to drive the pulp from the shroud outlets through atmosphere into the receptacle.

Further according to the invention the impeller is located on a drive shaft which carries sweep arms which are located adjacent at least one screening surface of the screen with the method including the step of sweeping the screening surface of the screen by means of the sweep arms as the impeller is rotated by the shaft.

A screen separator according to the invention includes an open topped cylindrical screen for axially vertical location, in use, in a tank containing pulp with the open top of the screen at or adjacent the full pulp surface level in the tank, an impeller which is located in the screen with its axis of rotation vertical and its upper end above the full pulp surface level in the tank, drive means, and a drive shaft connecting the drive means to the impeller with the impeller being adapted to drive pulp upwardly in the screen upwardly to a level above the surface level of the full pulp level in the tank when the impeller is rotated in the screen.

Further according to the invention the impeller includes a shroud which surrounds the impeller blades over a substantial portion of the length of the impeller with the shroud including at least one pulp outlet which, in use, is located above the full surface level of the pulp in a tank in which the screen separator is to be used.

Still further according to the invention the shroud is attached to the impeller blades for rotation with the impeller.

Yet further according to the invention the screen is annular in cross section with the impeller drive shaft concentrically located in the bore of the screen with the impeller blades attached to structure on the drive shaft and depending from the structure into the screen.

Conveniently the drive shaft carries sweep arms which are located parallel to and adjacent the screening surface of the screen so that rotation of the shaft will cause the sweep arms to sweep the/or each screening surface of the screen in use.

Conveniently the screen separator includes a housing which includes a moat which surrounds the impeller between the pulp outlet from the shroud and the full pulp surface level in the tank in use and a conduit for conveying pulp from the moat to an adjacent tank.

A process for recovering mineral values from a pulp by means of a series of adsorbtion cells which are located on a surface having a common level with each cell including a tank, a pulp inlet from a common pulp supply line, a pulp outlet conduit the inlet of which is at a higher level than the full pulp surface level in the tank and a screen separator of the invention for lifting screened pulp from within the screen of the separator in the tank to the inlet to the outlet conduit according to the invention includes the steps of charging the tanks on the outside of the screens with metal adsorbent particles, filling the first tank in the series with a mineral rich pulp, agitating the mixture in the tank, screen separating the metal loaded particles from the remainder of the pulp, lifting the lean pulp from the screen to the inlet to the outlet conduit during the separation process and gravity feeding the lean pulp to a second cell in the series, again screening and lifting the now further leaned pulp from the second cell and feeding it to a third cell in the series and so on, sequentially closing the pulp inlets to the cells when the adsorbent particles in a cell are fully loaded with the pulp metal, discharging the particles from the tank and feeding the particles from the tank discharge to a storage vessel for further processing while continuing to feed the pulp from the common supply line to the next cell in the series so that the metal recovery process is continuous.

BRIEF DESCRIPTION OF THE DRAWINGS

The invention is now described by way of example only with reference to the drawings in which.

DETAILED DESCRIPTION OF THE PREFERRED EMBODIMENT

Figure 1:
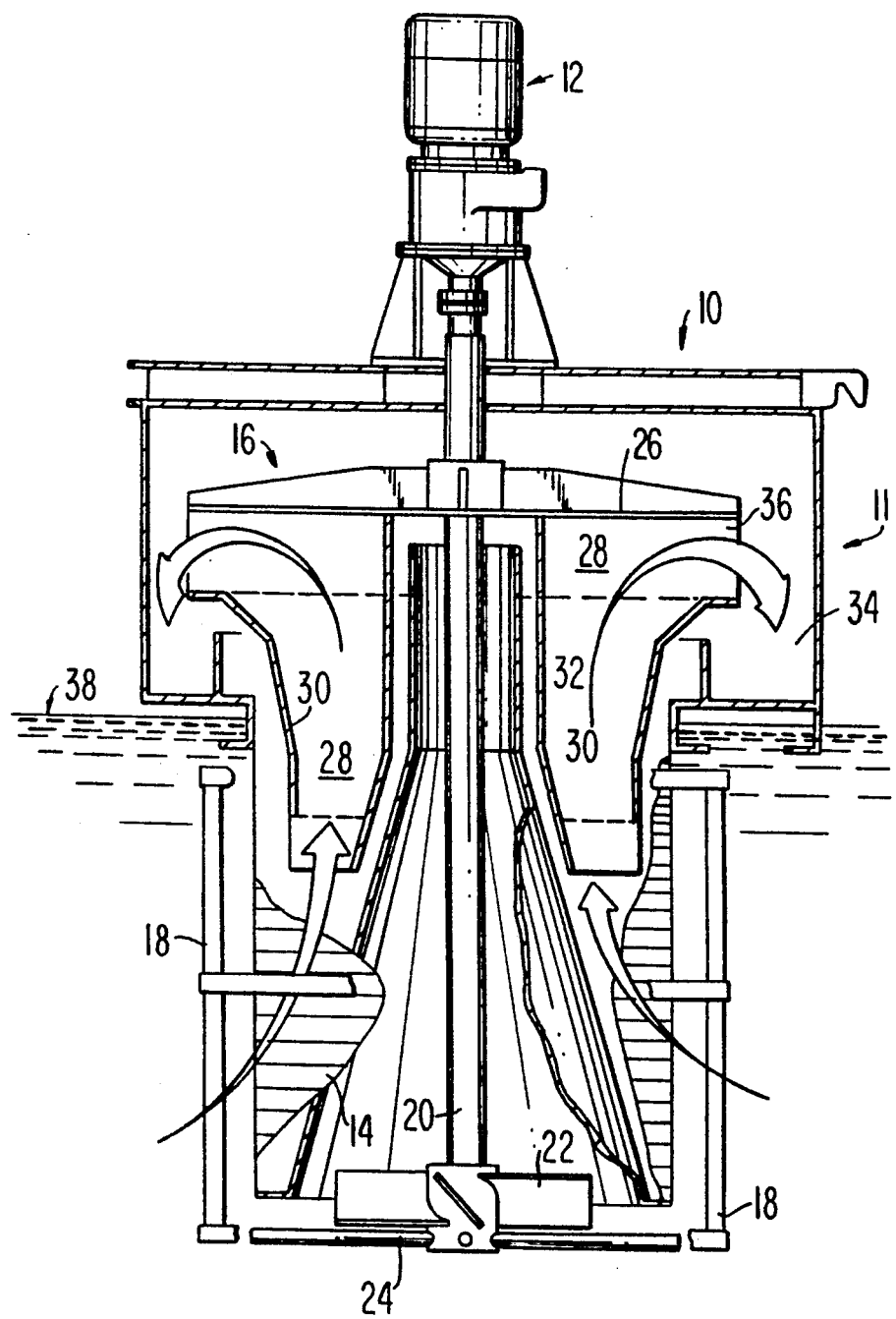
FIG. 1 is a partially schematic sectioned side elevation of one embodiment of the screen separator of the invention located in a tank containing pulp.

The screen separator of the invention is shown in FIG. 1 of the drawings to include a support structure 10 which is centrally held over a tank of a conventional adsorbtion cell, not shown, by means of suitable bracing elements which are also not shown in the drawing. The support structure carries a motor 12, a volute 11, a screen arrangement 14, an impeller 16, sweep arms 18 and a drive shaft 20 to which the impeller and sweep arms are connected.

The screen arrangement 14 is annular in cross section, open at the top and closed at the bottom with the inner surface of the screen being upwardly and inwardly tapered as shown in the drawing. The screen is constructed from wire mesh which may be clad with a finer screen material or may be a fine gauge wedge wire screen. On small capacity separators the frusto connical inner surface of the screen could be made from sheet metal with only the outer surface of the screen being water pervious. In larger separators both the inner and outer surfaces of the screen are made from screening material. The screen is attached to the underside of the volute 11, which is in turn rigidly attached to the underside of the support structure 10.

In larger variations of the screen separator of the invention which include screening material on the inner surface of the screen an impeller 22 could be fixed to the lower end of the drive shaft 20 to drive adsorbent material away from the inner surface of the screen 14.

A spider 24 is fixed to and projects radially from the lower end of the drive shaft 20 and carries the vertical sweep arms 18 as shown in the drawing. The sweep arms are located in close proximity to the outer surface of the screen so that rotation of the arms by the shaft 20 about the screen surface will agitate and so dislodge solids from the outer surface of the screen to prevent the screen from becoming choked. In the larger variations of the screen separator the spider 24 may, in addition to or in place of the impeller 22, carry inwardly inclined arms for sweeping the inner frusto connical screening surface of the screen 14.

Figure 2:
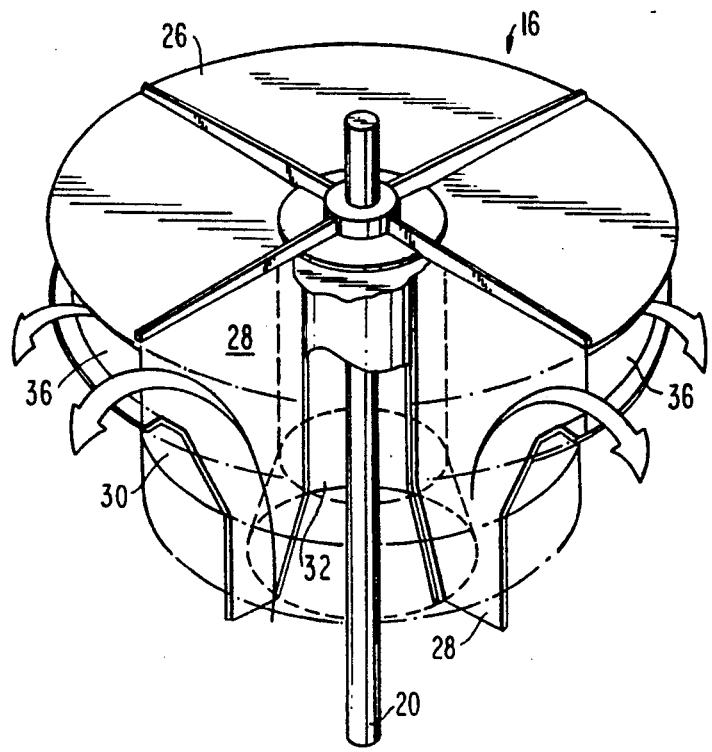
FIG. 2 is a partially sectioned perspective view of the impeller of the FIG. 1 screen separator.

The impeller 16, as is more clearly seen in FIG. 2, consists of an upper disc 26 which is releasibly attached to the shaft 20, four or more impeller blades 28 which are shaped as shown in the drawings, a shroud 30 which surrounds and is attached to the outer edges of the blades between the dotted line positions shown in FIG. 1 and a hub portion 32. The impeller is fixed to the shaft 20 so that the lower portions of the blades 28 are located in the screen 14 through its open top as shown in the drawing with the lower portion of the impeller hub 32 being situated closely adjacent the inner screening surface of the upper end of the screen.

In use, the tank in which the screen separator of the invention is located is charged, on the outside of the screen, with metal adsorbent particles and the tank is filled with a metal rich pulp. As the drive shaft of the separator is rotated the leaner pulp between the inner surfaces of the walls of the screen 14 is driven upwardly and outwardly on the impeller blades 28 by centrifugal and cyclonically induced forces towards the upper portion of the blades to be thrown from the impeller outlets 36 between the under surface of the disc 26 and the upper surface of the shroud 30 above the full surface level 38 of the pulp in the tank in which the screen separator is located. In this manner, a negative pressure is generated in screen 14 which causes pulp in the tank to be drawn through the screen of screen arrangement 14 with metal loaded adsorbtion particles above the screen size of the screen being trapped by the outer screening surfaces of the screen. As mentioned above, the impeller is rotated by the drive shaft 20 and so are the sweep arms 18 which agitate the solid material free of the screening surfaces of the screen to avoid the possibility of the screen becoming choked. A moat 34 is incorporated in the volute 11 to surround the impeller with its base above the surface of the pulp in the tank. The volute includes a run-off launder from the moat for gravity feeding the pulp which is pumped by the impeller into the trough 34 to an adjacent tank so that the pulp level in the adjacent tank need not be vertically lower than the pulp level in the tank from which the pulp is pumped.

Figure 3:
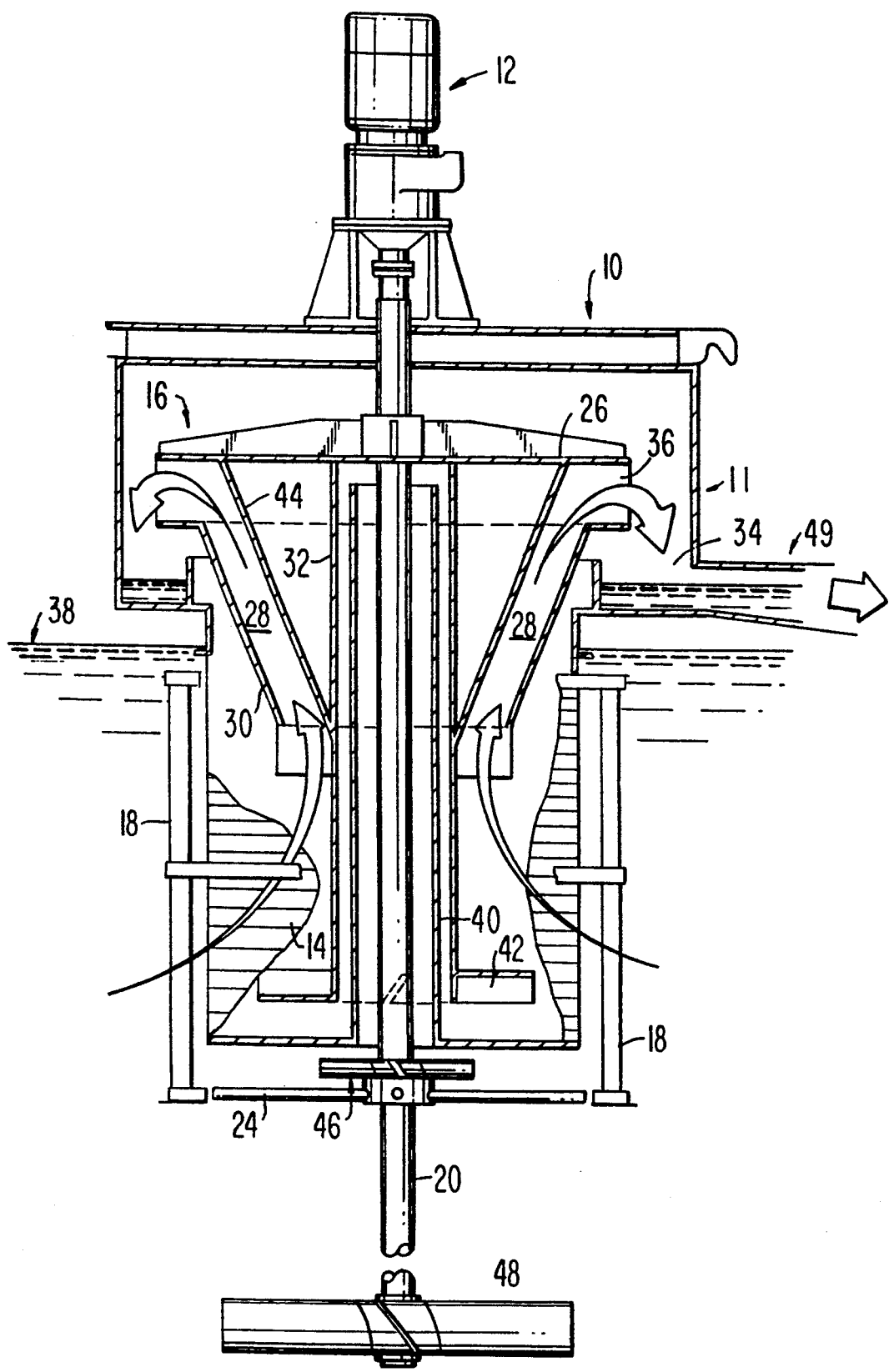
FIG. 3 is a view similar to that of FIG. 1 of a second embodiment of the screen separator of the invention.

In the FIG. 3 embodiment of the separator of the invention the base of the screen 14 and its inner wall 40 are made from solid sheet material. It is to be noted that unlike the frusto connical inner wall of the FIG. 1 screen the wall 40 of this screen is in the form of a parallel sided tube.

The impeller 16 of the FIG. 3 embodiment differs from that of FIG. 1 in a number of respects. The first difference is that its hub 32 is a tube which is concentrically located about the solid inner screen wall 40 and extends from the impeller disc 26 to a low level position in the screen tube 14. The bottom end of the hub 32 carries radially projecting impeller blades 42 which, on rotation of the impeller, drive pulp in the screen upwardly from its base portion towards the impeller blades 28. This low level impeller is also particularly useful in agitating solids which may have settled out onto the solid screen base, perhaps due to a loss of flow through the separator, back into an upward flow direction in the screen towards the impeller 16. The impeller blades 28, in this embodiment of the separator could, in dependence on the torque capabilities of the motor 12, extend further down into the screen than shown in the drawing further to improve the pump action of the impeller. A further difference between the two impellers is that the FIG. 3 impeller includes, between the shroud 30 and the hub 32, a frusto connical insert 44 which is fixed to the disc 26 and the hub 32. The insert 44 reduces, as seen in the drawing, the effective area of each of the impeller blades 28 from that of the FIG. 1 device and, because the insert has substantially the same cone angle as the shroud 30, provides parallel outwardly inclined fluid passages through the impeller which are uniform in cross sectional area over their length to minimise drop in the velocity of the pulp in its upward passage through the impeller. To improve the wear resistance of the impeller all surfaces of the impeller, such as the inner walls of the slurry passages through the impeller, the portion of the hub 32 which is, in use, in contact with the pulp in the screen and the impeller blades 42, could be clad with a wear resistant material such as a suitable rubber or like compound, polyurethane or the like.

The drive shaft 20 carries, at its lower end adjacent the wiper spider 24, an impeller 46 which is fixed to the shaft with its blades oppositely pitched to the blades 42 in the screen so that as the shaft is rotated the impeller 46 will drive the tank pulp downwardly and away from the lower end of the screen wall tube 40. The drive shaft 20 extends downwardly from the wiper spider 24 and carries on its free end yet a further impeller 48 which drives pulp, in the tank in which the separator is located, towards the base of the tank to promote suspension of the adsorbent particles in the pulp by agitation.

In use, the FIG. 3 screen separator functions in much the same manner as the FIG. 1 device with the obvious differences provided by the modified impeller and the impellers 42 and 48.

Obviously, the leaner pulp which is pumped by the impeller into the moat 34, in both embodiments of the separator, is aerated in its passage through atmosphere from the impeller to the moat. The aerated pulp, as with the FIG. 1 separator, is gravity fed through a launder 49 to an adjacent tank in the mineral separation process.

The separator of the invention is not limited to the precise details as herein described. For example, the impeller blades 28 are shown in the drawings of both embodiments of the invention to be vertical but they could equally well be, and preferably are, inclined from the vertical helically towards their lower ends in the direction of the rotation of the impeller so that a turbine effect will assist in sweeping the pulp upwardly on the blades 28. Alternatively, the lower ends of the blades 28 which project from the shroud 30 could be bent forwardly in the direction of rotation of the impeller for the same purpose. Additionally, the impeller of the FIG. 1 embodiment of the separator of the invention could include the insert 44 and the extended drive shaft and agitating impeller 48 of the FIG. 3 impeller.

Figure 4:
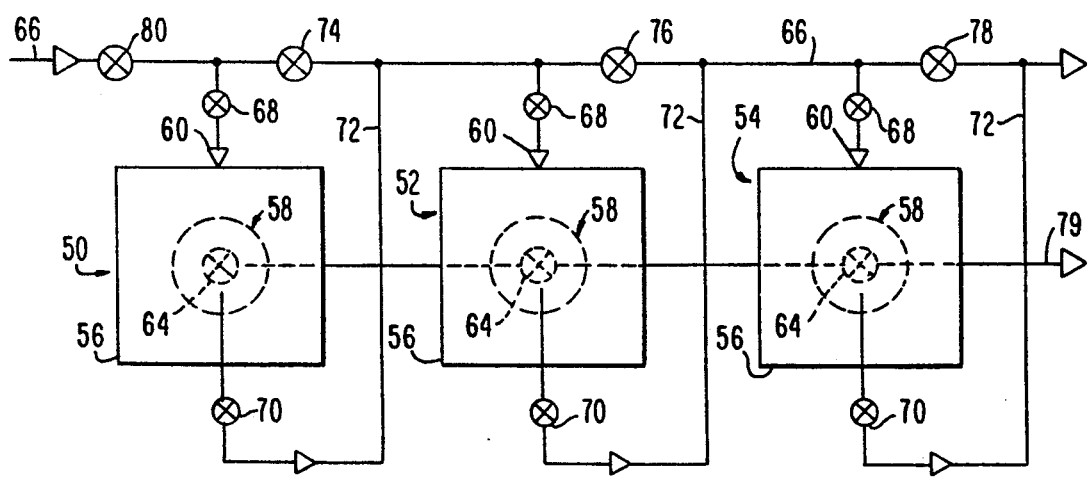
FIG. 4 is a schematic diagram of a series of adsorbtion cells in a mineral recovery process.

FIG. 4 illustrates 3 adsorbtion cells 50, 52 and 54 which form part of a series of identical cells in a process circuit for recovering metal values from a mineral rich pulp. The cells each include a conventional tank 56 which is well known in the art and has a domed bottom, a separator 58 of the invention, which may be either the FIG. 1 or 3 type, a pulp inlet 60, a pulp outlet 62 and a drain valve 64 which is located in the base of the tank below the separator 58.

In the process of the invention the tank inlets 60 are all connected into a common pulp feed line 66 from a source of metal rich pulp. Each tank inlet 60 is controlled by a shut-off valve 68.

An important feature of the process circuit of the invention is that tank pulp outlets 62 are connected through shut-off valves 70 and conduits 72 back into the common pulp feed line 66. The feed line includes isolator valves 74, 76 and 78 which are interposed between the inlet 60 of an upstream tank 56 and the inlet of the same tank outlet conduit 72 into the line 66 and the inlet 60 to the adjacent downstream tank in the series as shown in FIG. 4.

The tank dump or drain valves 64 are connected in series into an open adsorbent particle discharge conduit 79 which leads to a receiver tank, not shown.

In use, each of the tanks 56 in the process series are charged in the conventional manner with mineral adsorbent particles. The isolator valves 74, 76 and 78 are shut and the inlet valves 68 to the cells 50 and 52 are opened. A pulp control valve 80 in the line 66 is opened to allow the tank 56 of the cell 50 to fill to its full pulp level with metal rich pulp from the line 66. The screen separator 58 is now activated to agitate the pulp and adsorbent particles in the tank to cause the metal values in the solution to attach to the particles and to pump the leaned screen pulp from the screen to the trough 34 of the separator 58. The inlet valve 68 is adjusted to permit fresh pulp from the line 66 to enter the tank 56 at the same rate at which the separator 58 pumps the leaned pulp from the tank so that a full pulp surface level in the tank is maintained. When the tank 56 of the cell 52 has filled sufficiently its outlet valve 70 and the inlet valve to the cell 54 are opened and its separator 58 is activated for further extraction of metal values from the leaned pulp from the cell 50 with the yet leaner pulp being pumped to the cell 54 and so on through the series of cells until the process is continuous throughout the circuit.

When the pre-calculated saturation time of the adsorbent particles in the tank of the cell 50 has been reached the isolator valve 74 is opened and the inlet and outlet valves of the cell 50 are shut. Conveniently the outlet valve is only shut after the separator has ceased pumping leaned pulp to the cell 54 to reduce the liquid level of the pulp in the cell 50 to a minimum. The open valve 74 permits the high metal value pulp in the line 66 now to enter the cell 52. The dump valve 64 of the cell 50 is now opened and the metal rich adsorbent particles are pumped through the discharge conduit 79 to the receiver tank from where the liquids and solids are separated with the liquid being pumped to waste. The dewatered adsorbent particles are then further processed for the recovery of their metal values without interruption of the mineral recovery process. The emptied cell 50 is again charged with fresh adsorbent particles. The isolator valve 74 is progressively closed and fresh pulp is fed to the cell 50 while the circuit process remains operational. In this manner sequential cells in the circuit are emptied and again restarted to ensure uninterrupted operation of the process.

I claim:

1. A method of separating absorbent particles from a pulp in a tank including the steps of locating an open topped and closed bottom cylindrical screen in the tank with its open top at substantially the full pulp surface level in the tank, locating a bladed impeller, which includes a shroud which is fixed to the radial outer edges of the blades and a pulp outlet from the shroud, partially in and out of the screen in the tank with its axis of rotation vertical, its lower portion below the full pulp surface level in the tank its upper portion including the outlet above the full pulp surface level in the tank, rotating the impeller about its axis of rotation to drive pulp in the screen upwardly to and from the shroud outlet into a receptacle above the full pulp surface level in the tank and discharging the pulp from the receptacle to the outside of the tank to a level above the full pulp surface level in the tank.

2. A method as claimed in claim 1 in which the impeller is rotated by means of a drive shaft which additionally carries sweep arms which are located adjacent the screening surface of the screen and the screening surface of the screen is swept by means of the sweep arms as the drive shaft is rotated.

3. A method as claimed in claim 2 in which the screen is annular in cross-section, and the impeller drive shaft passes through the bore of the screen and carries an agitator impeller in the tank remote from the closed bottom of the screen and the pulp in the tank is agitated by means of the agitator impeller as the impeller drive shaft is rotated.

4. A method as claimed in claim 1 in which a second impeller is connected to the first impeller and is located in the screen below and spaced from the first impeller and the second impeller is rotated with the first impeller to drive pulp in the screen upwardly towards the first impeller as the impellers are rotated in the screen.

5. A screen separator for separating metal absorbent particles from a pulp including an open topped and closed bottom cylindrical screen for axially vertical location, in use, in a tank containing the pulp, said screen being situated in the tank with its open top substantially at the full pulp surface level in the tank, a bladed impeller which is located partially in and out of the screen in the tank with its axis of rotation vertical and its blades in and extending above the full pulp surface level in the tank, a shroud which surrounds and is fixed to the radial outer edges of the impeller blades to extend vertically over a substantial portion of the length of the impeller with the shroud including at least one pulp outlet which, in use, is located above the full pulp surface level in the tank, drive means, a drive shaft connected to the drive means, and means connecting the drive shaft to the impeller with the impeller being adapted to drive pulp in the screen upwardly within the shroud to and from its outlet above the full pulp surface level in the tank when the impeller is rotated in the screen by the drive shaft.

6. A separator as claimed in claim 5 in which the screen is annular in cross-section with the impeller drive shaft concentrically located in a bore of the screen and the drive shaft connecting means is fixed to the drive shaft above the screen with the impeller blades fixed to said drive shaft connecting means to depend therefrom downwardly into the screen.

7. A separator as claimed in claim 6 in which the drive shaft extends through the bore of the screen and includes radially projecting arms which extend across the closed bottom of the screen and carry sweep arms which are parallel to the outer screening surface of the screen so that rotation of the drive shaft will cause the sweep arms to sweep the screening surface of the screen in use.

8. A separator as claimed in claim 7 in which a second impeller is connected to the first to be located in the screen below and spaced from the first impeller to drive pulp in the screen upwardly towards the first impeller as the impellers are rotated by the drive shaft in the screen in use.

9. A separator as claimed in claim 7 including an agitator impeller on the drive shaft at a position below and remote from the closed bottom of the screen for agitating pulp in the tank below the screen as the drive shaft is rotated in use.

10. A separator as claimed in claim 5 including a housing which includes a moat which surrounds the impeller between its pulp outlet and the pulp surface level in the tank and a conduit for conveying, under gravity, pulp which is discharged from the impeller into the moat from the tank to a level on the outside of the tank above the full pulp surface level in the tank.

11. A screen separator for separating metal absorbent particles from a pulp including an open topped and closed bottom cylindrical screen for axially vertical location, in use, in a tank containing pulp with the open top of the screen at or adjacent the full pulp surface level in the tank, an impeller which is located in the screen with its axis of rotation vertical, drive means, a drive shaft connecting the drive means to the impeller with the impeller being adapted to drive pulp in the screen upwardly to a level above the surface level of the full pulp level in the tank when the impeller is rotated in the screen, and in which the impeller is located partially in and out of the pulp in the tank in use and includes a shroud which surrounds the impeller blades over a substantial portion of the length of the impeller with the shroud including at least one pulp outlet which, in use, is located above the full surface level of the pulp in a tank in which the screen separator is to be used, and the shroud is attached to the impeller blades for rotation with the impeller.

12. A separator as claimed in claim 11 in which the screen is annular in cross-section with the impeller drive shaft concentrically located in a bore of the screen with the impeller blades attached to the drive shaft and depending therefrom into the screen.

13. A screen separator for separating metal absorbent particles from a pulp including an open topped and closed bottom cylindrical screen for axially vertical location, in use, in a tank containing pulp with the open top of the screen at or adjacent the full pulp surface level in the tank, an impeller which is located in the screen with its axis of rotation vertical, drive means, a drive shaft connecting the drive means to the impeller with the impeller being adapted to drive pulp in the screen upwardly to a level above the surface level of the full pulp level in the tank when the impeller is rotated in the screen, a second impeller which is situated in the screen below the first impeller and which is rotatable with the first impeller to drive pulp in the screen towards the first impeller in use, and a third impeller on the impeller drive shaft below the bottom of the screen for agitating, in use, the pulp in the tank below the screen.

14. A screen separator for separating metal absorbent particles from a pulp including an open topped and closed bottom cylindrical screen for axially vertical location, in use, in a tank containing pulp with the open top of the screen at or adjacent the full pulp surface level in the tank, an impeller which is located in the screen with its axis of rotation vertical, drive means, a drive shaft connecting the drive means to the impeller with the impeller being adapted to drive pulp in the screen upwardly to a level above the surface level of the full pulp level in the tank when the impeller is rotated in the screen, and in which the impeller is located partially in and out of the pulp in the tank in use and includes a shroud which surrounds the impeller blades over a substantial portion of the length of the impeller with the shroud including at least one pulp outlet which, in use, is located above the full surface level of the pulp in a tank in which the screen separator is to be used, and a moat which surrounds the impeller between its pulp outlets and the pulp surface in the tank in use and a conduit for conveying pulp from the moat to an adjacent tank.

* * * * *